(12) United States Patent
Dorner et al.

(10) Patent No.: US 10,936,799 B2
(45) Date of Patent: Mar. 2, 2021

(54) DISTRIBUTED DYNAMIC DISPLAY OF CONTENT ANNOTATIONS

(71) Applicant: Amazon Technologies, Inc., Seattle, WA (US)

(72) Inventors: Charles Shearer Dorner, Seattle, WA (US); Robert Yuji Haitani, Seattle, WA (US); Jongwoo Lee, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/172,559

(22) Filed: Oct. 26, 2018

(65) Prior Publication Data

US 2019/0065454 A1 Feb. 28, 2019

Related U.S. Application Data

(63) Continuation of application No. 15/281,614, filed on Sep. 30, 2016, now Pat. No. 10,146,758.

(51) Int. Cl.
*G06F 40/169* (2020.01)
*G06Q 50/00* (2012.01)
(Continued)

(52) U.S. Cl.
CPC ............ *G06F 40/169* (2020.01); *G06F 21/00* (2013.01); *G06F 40/106* (2020.01); *G06F 40/117* (2020.01); *G06Q 10/10* (2013.01); *G06Q 10/101* (2013.01); *G06Q 50/01* (2013.01); *H04L 65/1069* (2013.01); *H04L 65/4069* (2013.01); *G06F 3/04817* (2013.01); *H04L 67/10* (2013.01); *H04L 67/26* (2013.01); *H04L 67/322* (2013.01)

(58) Field of Classification Search
CPC .... G06F 17/241; G06F 17/212; G06F 17/218; G06F 3/04817; G06F 40/169; G06F 40/117; G06F 40/106; G06F 21/00; H04L 65/1069; H04L 67/10; H04L 63/00; H04L 65/4069; H04L 67/26; H04L 67/322; G06Q 10/10; G06Q 10/101; G06Q 50/01
USPC ......................................... 715/230, 232, 233
See application file for complete search history.

(56) References Cited

U.S. PATENT DOCUMENTS

| | | |
|---|---|---|
| 5,146,552 A | 9/1992 | Cassorla |
| 5,513,305 A | 4/1996 | Maghboudeleh |

(Continued)

*Primary Examiner* — Andrew R Dyer
(74) *Attorney, Agent, or Firm* — Knobbe, Martens, Olson & Bear, LLP

(57) ABSTRACT

Features are provided for the distributed moderation of content annotations and the dynamic display of the moderated annotations. The annotations can be selectively distributed to subsets of user devices currently viewing a content item, thereby limiting the number of annotations that each user device receives. By selectively distributing only subsets of new annotations, users can give more attention to individual annotations and provide meaningful moderation information (e.g., ratings, "likes," responses, etc.) regarding individual annotations. The annotations can be displayed in a manner that emphasizes the more highly-rated annotations and/or commonly-submitted annotations over other annotations. The annotations can also be displayed in a manner that provides visual cues regarding the sources of individual annotations.

17 Claims, 7 Drawing Sheets

(51) Int. Cl.
    *G06F 21/00*           (2013.01)
    *H04L 29/06*          (2006.01)
    *G06Q 10/10*          (2012.01)
    *G06F 40/106*        (2020.01)
    *G06F 40/117*        (2020.01)
    *H04L 29/08*         (2006.01)
    *G06F 3/0481*       (2013.01)

(56) References Cited

U.S. PATENT DOCUMENTS

| | | | |
|---|---|---|---|
| 6,230,169 B1 * | 5/2001 | Nagae | G06F 40/169 |
| | | | 715/203 |
| 6,335,738 B1 | 1/2002 | Englefield et al. | |
| 6,568,939 B1 | 5/2003 | Edgar | |
| 7,296,139 B1 * | 11/2007 | Case | G06F 12/0897 |
| | | | 710/26 |
| 7,506,246 B2 | 3/2009 | Hollander et al. | |
| 7,508,354 B1 * | 3/2009 | Sanders | G06F 3/0488 |
| | | | 345/1.1 |
| 7,647,452 B1 * | 1/2010 | Moll | G06F 12/0804 |
| | | | 711/118 |
| 8,676,913 B1 * | 3/2014 | Roche | G06Q 50/01 |
| | | | 709/206 |
| 8,706,734 B2 * | 4/2014 | Duman | G06F 40/169 |
| | | | 707/738 |
| 9,342,502 B2 | 5/2016 | Edwards et al. | |
| 9,503,681 B1 * | 11/2016 | Popescu | G06F 3/011 |
| 9,552,334 B1 * | 1/2017 | Meisels | G06Q 50/01 |
| 9,769,008 B1 | 9/2017 | Petts et al. | |
| 9,798,708 B1 | 10/2017 | Sharifi et al. | |
| 10,042,832 B1 * | 8/2018 | Vagell | G06F 40/169 |
| 2003/0101181 A1 | 5/2003 | Al-Kofahi et al. | |
| 2004/0021685 A1 | 2/2004 | Denoue et al. | |
| 2004/0243554 A1 * | 12/2004 | Broder | G06F 16/31 |
| 2005/0027664 A1 * | 2/2005 | Johnson | G06F 40/45 |
| | | | 706/12 |
| 2005/0120030 A1 * | 6/2005 | Varpela | H04L 41/12 |
| 2007/0027931 A1 | 2/2007 | Heckenbach | |
| 2007/0055926 A1 | 3/2007 | Christiansen et al. | |
| 2007/0143663 A1 * | 6/2007 | Hansen | G06F 40/169 |
| | | | 715/203 |
| 2007/0271503 A1 * | 11/2007 | Harmon | G06F 40/169 |
| | | | 715/230 |
| 2008/0059872 A1 | 3/2008 | Tseng et al. | |
| 2008/0215583 A1 * | 9/2008 | Gunawardena | G06F 16/9535 |
| 2009/0100078 A1 * | 4/2009 | Lai | G06F 16/95 |
| 2009/0204637 A1 | 8/2009 | Li et al. | |
| 2009/0319884 A1 | 12/2009 | Armento et al. | |
| 2010/0095196 A1 * | 4/2010 | Grabarnik | G06F 16/285 |
| | | | 715/230 |
| 2010/0145678 A1 | 6/2010 | Csomai et al. | |
| 2011/0016150 A1 * | 1/2011 | Engstrom | G06F 16/58 |
| | | | 707/778 |
| 2011/0047517 A1 * | 2/2011 | Lee | G06F 3/04883 |
| | | | 715/863 |
| 2011/0265023 A1 * | 10/2011 | Loomis | G06F 3/04812 |
| | | | 715/771 |
| 2011/0289432 A1 | 11/2011 | Lucas | |
| 2012/0072204 A1 | 3/2012 | Nasri et al. | |
| 2012/0150789 A1 * | 6/2012 | Jhoney | G06N 5/048 |
| | | | 706/52 |
| 2013/0185657 A1 * | 7/2013 | Gunawardena | G06F 40/169 |
| | | | 715/753 |
| 2013/0275880 A1 * | 10/2013 | Bachman | G06F 16/40 |
| | | | 715/751 |
| 2013/0318465 A1 * | 11/2013 | Cheng | G06Q 10/101 |
| | | | 715/776 |
| 2014/0272832 A1 | 9/2014 | Mitkov et al. | |
| 2015/0074506 A1 * | 3/2015 | Dunn | G06F 3/0481 |
| | | | 715/230 |
| 2016/0119265 A1 | 4/2016 | Akavaram et al. | |
| 2017/0010803 A1 * | 1/2017 | Hillion | G06F 3/0238 |
| 2017/0069020 A1 * | 3/2017 | Goyal | G06Q 40/02 |

* cited by examiner

DISTRIBUTED DYNAMIC DISPLAY OF CONTENT ANNOTATIONS

CROSS-REFERENCE TO RELATED APPLICATION

The present application is a continuation of U.S. patent application Ser. No. 15/281,614, filed Sep. 30, 2016, the contents of which are incorporated by reference herein.

BACKGROUND

Generally described, computing devices and communication networks can be utilized to exchange content and other information. In a common application, a server computing system can provide content to various client computing devices. For example, a server computing system can host or provide access to videos that are viewable by multiple client computing devices simultaneously or substantially simultaneously. The videos may be transmitted or "streamed" to the client computing devices such that each of the client computing devices receives and displays the same portion of the video at about the same (e.g., video streams of live broadcasts).

In some implementations, users of the client computing devices (or "clients") may submit annotations or "comments" regarding content that is displayed on the client computing devices. For example, a user may view a video stream on a client computing device, and submit a comment to the server computing system (or "server") about what is currently being shown in the video. The server can distribute the comment to other clients for display. Users of the other clients can then view the comment, submit their own comments, etc. Thus, a comment list or "feed" shown on any particular client in connection with the video can include comments from many different clients. Newer comments can replace older comments, causing the older comments toward the end of a comment list or off of the display. In some cases, the newer comments may be added to the end of a comment list.

Some servers may implement moderation of comments to avoid distributing inappropriate or offensive comments (or links to inappropriate or offensive content). For example, a server may block or reject comments that include particular words or phrases, comments that include links to other content, etc. Users who repeatedly submit comments that get rejected or that otherwise do not pass the moderation standards of the server may be prevented from submitting comments in the future.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
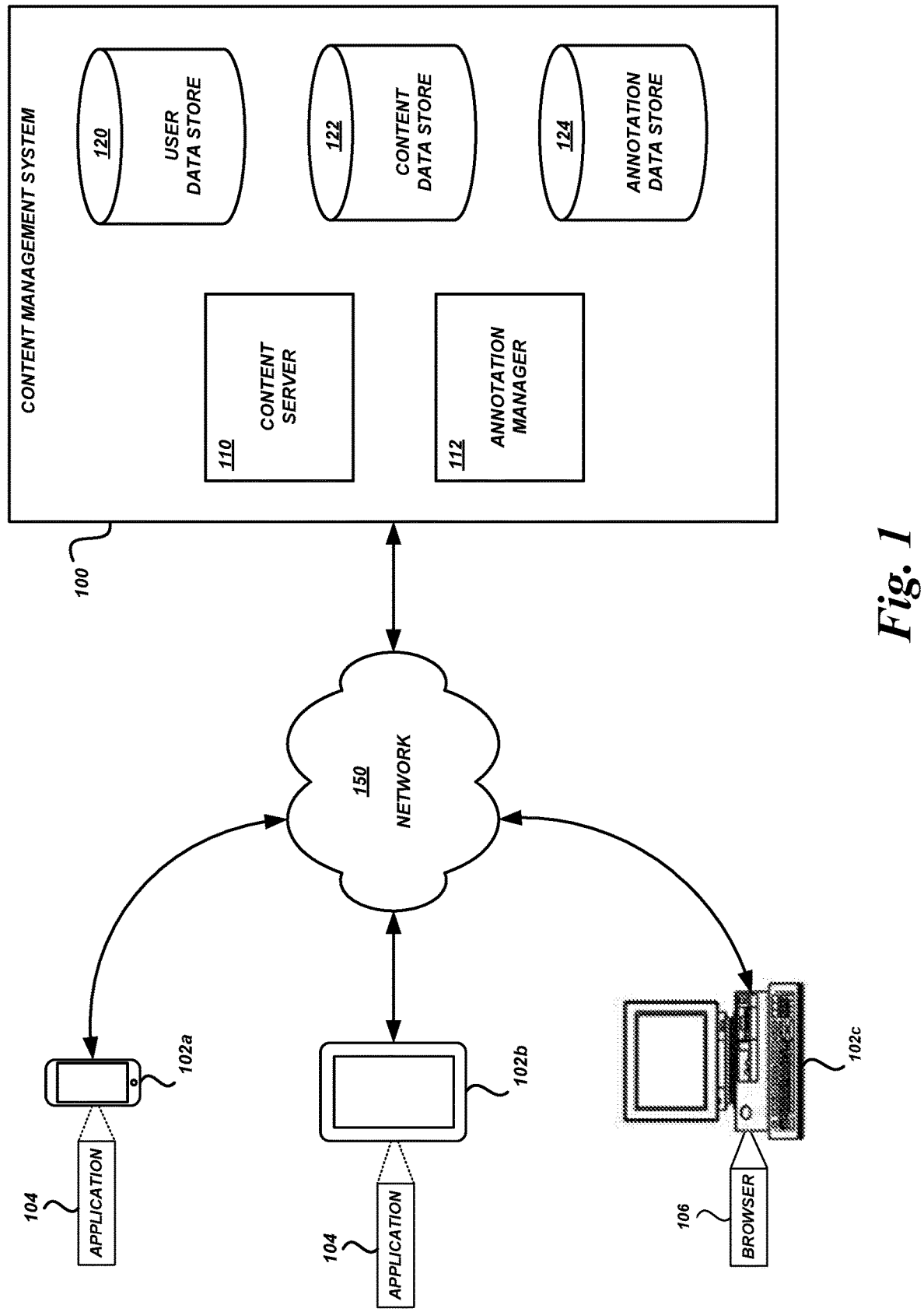
FIG. 1 is a block diagram of an illustrative computing environment including a content management system and various user devices according to some embodiments.

The present disclosure is directed to the distributed moderation of annotations, and the dynamic display of the moderated annotations. A content management system can provide content to multiple user devices, and distribute any content annotations or "comments" received from user devices to other user devices. The content management system can selectively distribute subsets of new annotations to individual user devices, thereby limiting the number of annotations that each user device receives. By selectively distributing only subsets of new annotations, users can give more attention to individual annotations and provide meaningful moderation information (e.g., ratings, "likes," responses, etc.) regarding individual annotations. The content management system can then select the most relevant or highly-rated annotations for distribution to more user devices (or all user devices), while suppressing distribution of less relevant or less highly rated annotations. The annotations can be displayed in a manner that emphasizes the more highly-rated annotations and/or commonly-submitted annotations over other annotations. The annotations can also or alternatively be displayed in a manner that provides visual cues regarding the sources of individual annotations.

Some conventional systems use automated moderation algorithms to prevent abuse and otherwise moderate annotations to content. Such algorithms may be based on identifying and suppressing distribution of annotations that include inappropriate or offensive words, links to inappropriate or offensive content, etc. However, such automated moderation algorithms may fail to prevent the distribution of irrelevant annotations, abusive or offensive annotations that do not use predetermined words, annotations that are duplicative or needlessly cumulative, etc. Some systems try to address these shortcomings through user self-moderation, allowing the users tag annotations as inappropriate or irrelevant. Once an annotation receives such a tag (or a threshold number or percentage of such tags), the annotation may be suppressed. However, in the case of live content streams, there may be too many annotations for the users to self-moderate effectively (e.g., annotations may be added faster than users can read and moderate them while still viewing the live content stream). In addition, the inappropriate or irrelevant annotations may already be distributed to—and viewed by—all users or a substantial portion of viewers before the annotations can be tagged and suppressed.

Some aspects of the present disclosure relate to selectively distributing annotations to subsets of users for moderation before determining whether to distribute the annotations to a larger subset of users (or all users). By initially distributing annotations to only a subset of users, the individual users may have time to view and tag any inappropriate or irrelevant annotations before the annotations are distributed to—and viewed by—all users or a substantial portion of users. In addition, users can identify annotations that are relevant or interesting, and those annotations can be distributed the other users. In some embodiments, a content management system can determine a maximum number of annotations (or a number of words) to be viewed by each user per unit of time. As new annotations are submitted by users, they can be grouped and provided to subsets of users such that the users are not provided with more annotations than the determined maximum. As annotations satisfy the moderation rules of the content management system (e.g., are not tagged as inappropriate by a threshold number of users, are tagged as relevant by a threshold number of users, etc.), the annotations can be provided to larger subsets or to all users, along with additional new annotations for moderation. The content management system can repeat this process as long as new annotations are submitted or previously-submitted annotations satisfy the moderation rules.

Additional aspects of the present disclosure relate to graphical user interfaces that display annotations such that the annotations can be read and moderated, or such that relevant annotations can be emphasized over less relevant annotations. In some embodiments, annotations can be separated by relevance or a need for moderation. Different groupings of the annotations can then be displayed differently. For example, the most relevant annotations and/or newest annotations needing moderation may be displayed on a larger portion of the display screen than less-relevant annotations. In some embodiments, duplicative or cumulative annotations can be displayed once, with a visual effect to indicate that multiple annotations are being grouped and displayed once. For example, each user or group of users may be graphically represented on the display screen by an avatar, icon, or the like. When an annotation that is representative of multiple annotations is to be presented (e.g., when multiple users indicate laughter at a particular portion of a live video stream), the annotation can be presented with a graphical connection such as a line to the avatar or icon for each user that submitted a grouped annotation. In some embodiments, different classes of annotations may be displayed differently. For example, when an annotation is a question, the question may be displayed long enough so that other users have a chance to answer the question.

Although aspects of some embodiments described in the disclosure will focus, for the purpose of illustration, on particular examples of content, annotations, and user interfaces, the examples are illustrative only and are not intended to be limiting. In some embodiments, the techniques described herein may be applied to additional or alternative content, annotations, etc. For example, the content to be annotated may include a video, image, audio content item, online conference (with or without video or screen sharing), slide show, product information page, message board topic, or the like. As another example, reviews of products or content may be selectively distributed and/or displayed using the techniques described herein. As a further example, annotations may be selectively distributed and/or displayed using the techniques described herein even when the content to which the annotations relate is not presented "live" or in substantially real-time to all users. Various aspects of the disclosure will now be described with regard to certain examples and embodiments, which are intended to illustrate but not limit the disclosure.

Network-Based Content Delivery Environment

With reference to an illustrative embodiment, FIG. 1 shows a network environment in which aspects of the present disclosure may be implemented. As shown, the network environment may include a content management system 100 and various user devices 102a, 102b, and 102c (collectively "user devices 102"). The user devices 102 and content management system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The content management system 100 may include various components for providing the features described herein. Illustratively, the content management system 100 may include a content server 110 configured to provide content to the various user devices 102. The content management system 100 may also include an annotation manager 112 configured to selectively distribute annotations to the user devices 102 and manage the moderation of the distributed annotations. The content management system 100 may also include various data stores to store data and/or files in connection with content and annotation management. For example, the content management system 100 may include a user data store 120 to store data about individual users, including information regarding the users' demographic characteristics, browse history, user groupings, submission and/or moderation of annotations, and the like. The content management system 100 may also include a content data store 122 to store the content items (or information about the content items) available to be distributed to user devices 102. The content management system 100 may also include an annotation data store 124 to store annotations and information regarding the annotations submitted by user devices 102, including moderation interactions by users.

The content management system 100 may be implemented on one or more physical server computing devices that provide computing services and resources to users. Illustratively, the content management system 100 (or individual components thereof, such as the content server 110, annotation manager 112, or data stores 120, 122, and 124) may be implemented on one or more blade servers, midrange computing devices, mainframe computers, desktop computers, or any other computing device configured to provide computing services and resources. In some embodiments, the features and services provided by the content management system 100 may be implemented as web services consumable via the communication network 150. In further embodiments, the content management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device 102 to retrieve content and annotations from—and/or to submit annotations or moderation information to—the content management system 100. In some embodiments, a user may launch specialized application software, such as a mobile application 104 executing on a particular user device, such as a smart phone 102a or tablet computer 102b. The application 104 may be specifically designed to interface with the content management system 100 for accessing content and/or interacting with annotations. In some embodiments, a user may use other application software, such as a browser application 106, to interact with the content management system 100.

Annotation Management Process

Figure 2:
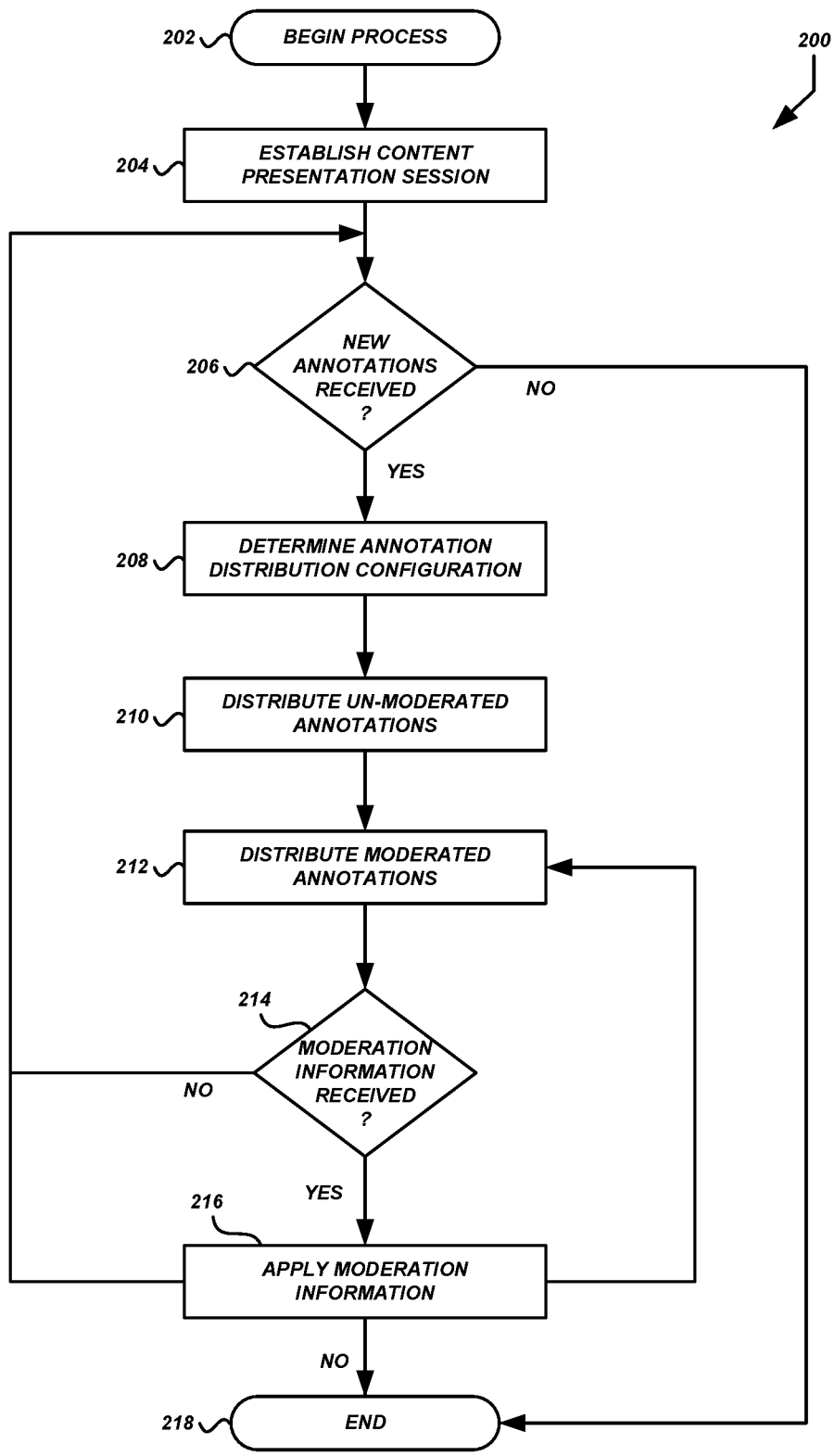
FIG. 2 is a flow diagram of an illustrative process for distributed moderation of annotations according to some embodiments.

FIG. 2 is a flow diagram of an illustrative process 200 for managing content annotations. A content management system 100 performing the process 200 may obtain content annotations from multiple user devices, manage the distributed moderation of subsets of the content annotations, and then distribute the annotations that satisfy the moderation rules of the content management system 100. Advantageously, the distributed moderation of annotations can improve the overall user experience when viewing content and annotations provided by the content management system 100 because users will be provided with annotations that have already satisfied the moderation guidelines and only a subset of new or otherwise un-moderated annotations, thereby reducing the number of inappropriate or irrelevant annotations each user device receives. The process 200 will be described with reference to FIGS. 3 and 4, which are block diagrams of a content management system 100 and various user devices 102a-102n at various stages during the process 200.

The process 200 begins at block 202. The process 200 may begin in response to an event, such as when an event to be streamed is scheduled to begin. When the process 200 is initiated, a set of executable program instructions stored on one or more non-transitory computer-readable media (e.g., hard drive, flash memory, removable media, etc.) may be loaded into memory (e.g., random access memory or "RAM") of a server or other computing device of the content management system 100. The executable instructions may then be executed by a hardware-based computer processor (e.g., a central processing unit or "CPU") of the computing device. In some embodiments, the process 200 or portions thereof may be implemented on multiple computing devices and/or multiple processors, serially or in parallel.

At block 204, the content server 110 or some other module or component of the content management system 100 may establish a content presentation session. The content server 110 may establish the content presentation session for presentation of a live or substantially real-time broadcast, or "stream," of content to multiple user devices. For example, the content may be or include a stream of video content regarding a live event, such as an interview or demonstration, a sporting event, or the like. Multiple user devices 102 may open connections with the content management system 100 to access the content, and the same portion of content may be provided to some or all of the multiple user devices substantially concurrently (e.g., at substantially the same time, with some variance for network latency, buffering, processing speed, etc.). In some embodiments, the content may be provided by, or accessed using, an external content source. For example, a content source separate from the content management system may provide a stream of video to the content management system 100. As another example, an external content source may provide the content directly to user devices, and may employ the annotation management services provided by the content management system to manage annotations to the content.

Figure 3:
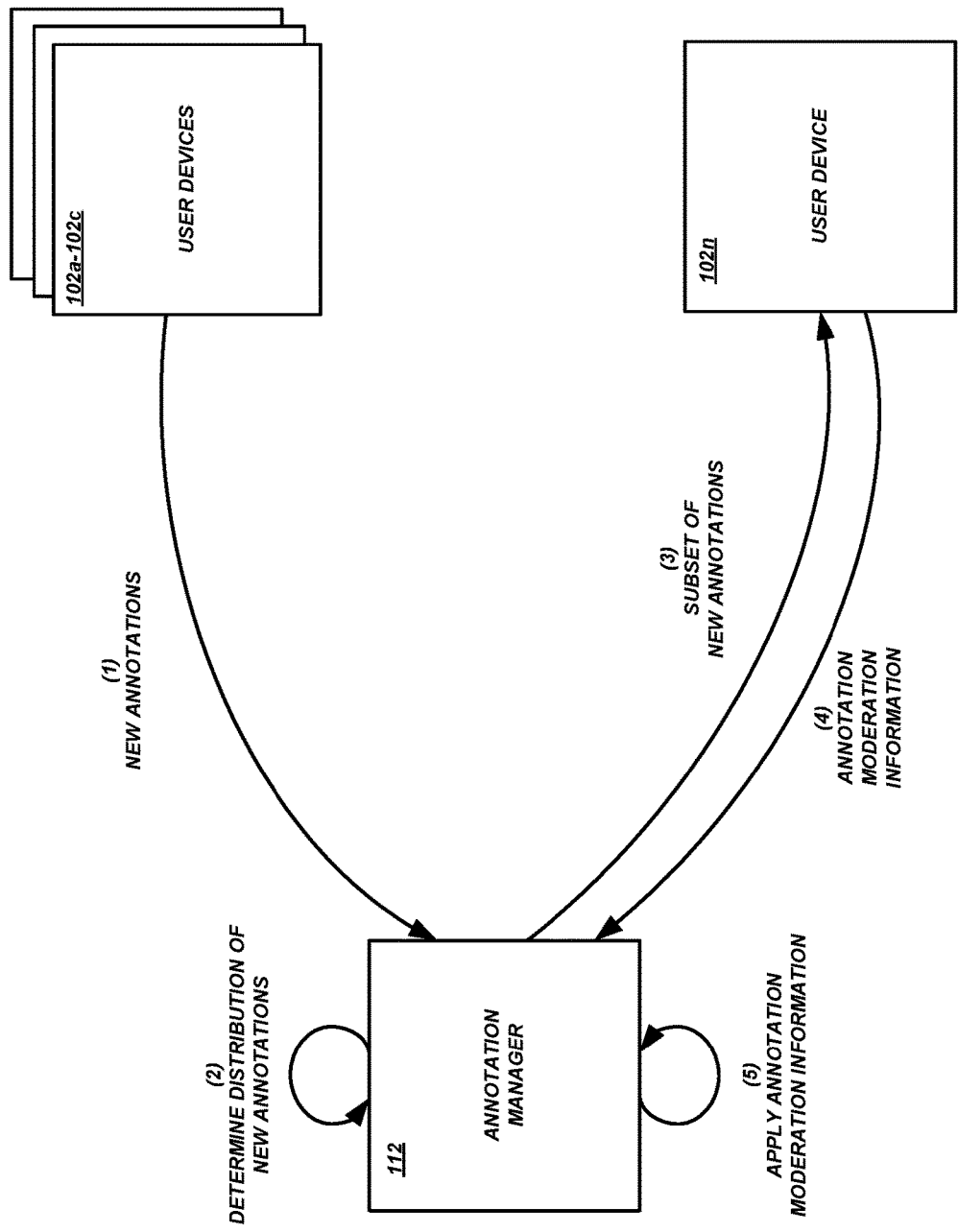
FIGS. 3 and 4 are block diagrams showing example data flows and interactions between user devices and an annotation manager according to some embodiments.

At decision block 206, the annotation manager 112 or some other module or component of the content management system 100 can determine whether new annotations for the content have been received. For example, as shown in FIG. 3, the annotation manager 112 may receive new annotations from user devices 102a, 102b, and 102c at (1). The annotations may be textual comments typed by users into a general purpose browser 106 or a specialized application 104 at the user devices 102a-102c. In some embodiments, the annotations may be recordings of user utterances, or transcriptions of user utterances generated by automatic speech recognition ("ASR") components executing on the user devices 102a-102c. In some embodiments, the annotations may be visual annotations, such as images, drawings, animations, videos, or the like. The annotation manager 112 may store new annotations in the annotations data store 124. If new annotations have been received, the process 200 may proceed to block 208. Otherwise, the process 200 can terminate at block 218.

At block 208, the annotation manager 112 or some other module or component of the content management system 100 can determine how to distribute the new, un-moderated, or not sufficiently moderated annotations to user devices. The determination may be referred to as a distribution configuration. In determining the distribution configuration, the number of moderators for each annotation can be based on the number of users in the current content session and the number of annotations that have been received (or are predicted to be received). The annotation manager 112 may set a target or threshold number of annotations to be seen by each user in a given period of time. For example, the target or threshold may be 10 annotations per minute. If the annotation manager 112 receives only one annotation per minute, then the annotations may be provided to all users. However, if the annotation manager 112 receives 100 annotations per minute, then the annotation manager 112 may determine that each annotation is to be provided to only a subset of the users, such as 5% of the users (e.g., 100 total annotations divided by 10 annotations per minute maximum divided by 2 so that moderated annotations can be provided in addition to new un-moderated annotations). Thus if there are 500 users watching the stream, each user will see 10 annotations per minute, and each new annotation will be provided to only 25 users. Those 25 users will then have the opportunity to moderate the annotation. In some embodiments, other metrics and/or targets may be used to selectively distribute subsets of annotations to users. For example, a target or threshold number of words per unit time may be used instead of annotations per unit time. In some embodiments, only a subset of user devices may receive new annotations, or a subset of user devices may receive substantially more new annotations than other user devices. The determination of which user devices are to be provided with new annotations may be based on historical moderation information received from individual users. Illustratively, a first user may be significantly more likely to provide moderation information than a second user. The first user, and other users with similar histories, may be selected to moderate new annotations, while the second user and other users with similar histories may be provided with fewer new annotations.

At block 210, the annotation manager 112 or some other module or component of the content management system 100 can distribute the new annotations to the subsets of users determined above at block 208. As shown in FIG. 3, the annotation manager 112 can determine the distribution of new annotations at (2), and then distribute the new annotations according to the determined distribution configuration at (3). For example, the annotation manager 112 may provide a subset of new annotations to user device 102n at (3).

At block 212, the annotation manager 112 or some other module or component of the content management system 100 can distribute moderated annotations to the user devices. In some embodiments, the annotation manager 112 can select moderated annotations that have satisfied one or more moderation rules or criteria. For example, a moderation criterion for providing annotations to additional user devices may be whether the annotations have been approved by a threshold number or proportion of users who have viewed the annotations (e.g., 10%). In some embodiments, annotations that have satisfied moderation criteria may be displayed according to different display parameters than un-moderated annotations. For example, moderated annotations may be shown for a longer period of time, or "TTL" (time-to-live) than un-moderated annotations, be shown larger or otherwise displayed more prominently, etc. Thus, annotations that have satisfied the moderation criteria of the annotation manager 110 may not only be provided to more user devices, but may also be shown for longer periods of time and/or shown in larger portions of the display. Returning to the example described above in block 208, annotations that have satisfied the moderation criteria may now be displayed for 10 seconds (a 6-annotations-per-minute rate) instead of 6 seconds (the original 10-annotations-per-minute rate). Annotations that have only partially satisfied the moderation criteria, or have satisfied a lower tier of moderation criteria, may be shown for less time (e.g., 3 seconds each, or a 20-annotations-per-minute rate).

At decision block 212, the annotation manager 112 or some other module or component of the content management system 100 can determine whether new moderation information has been received for the annotations provided above. For example, as shown in FIG. 3, the user device 102n was provided with a subset of annotations at (3). A user of the user device 102n may have submitted moderation information regarding some or all of the annotations, and the user device 102n may transmit that information to the annotation manager at (4). The received moderation information may be stored in the annotations data store 124. If the annotation manager has received moderation information, the process 200 may proceed to block 216. Otherwise, the process 200 may return to decision block 206.

Moderation information may reflect a unary operation, such as the tagging of annotations or portions of the content itself to simply indicate approval or agreement (e.g., a "like" button, without a corresponding opposite "dislike" button), or to report potentially offensive, inappropriate, or irrelevant content (e.g., a "report abuse" button). In some embodiments, moderation may be a binary operation, where users can indicate either approval or disapproval (e.g., a set of "thumbs up" and "thumbs down" buttons). In some embodiments, moderation may be more granular and may allow users to indicate a wider range of opinions about an annotation or a portion of content (e.g., a star or numerical rating system in which users can assign 1 to 5 stars or a numerical value from 1 to 10). In some embodiments, users may annotate the annotations, such as providing text that responds to a question or assertion in an annotation, or which provides more information against which to apply moderation criteria.

At block 216, the annotation manager 112 or some other module or component of the content management system can apply annotation moderation information received from the user devices above. For example, as shown in FIG. 3, the annotation manager 112 may analyze the received moderation information against moderation criteria at (5) to determine whether annotations are to be provided to additional user devices, whether annotations are to be blocked from distribution, or to determine if some other action is to be taken. The moderation criteria may include one or more thresholds related to the quantity and/or type of moderation information received. For example, a threshold number or percentage of "positive" tags ("like," "thumbs up," high rating, etc.) may be required for a particular annotation in order for the annotation to satisfy the moderation criteria and be provided to other user devices. As another example, a threshold number or percentage of "negative" tags ("dislike," "thumbs down," "report abuse," low rating, etc.) may be permitted. Once the threshold has been satisfied, the annotation may not be permitted to be provided to other user devices.

In some embodiments, moderation information from different users may be applied differently. For example, a first user may have submitted a threshold number or percentage of annotations that eventually satisfy moderation criteria, or which tend to be more highly rated than annotations from other users. A second user may have failed to submit a threshold number or percentage of annotations that eventually satisfy moderation criteria, or the second user may have submitted a threshold number or percentage of annotations that other users have tagged as inappropriate or irrelevant. Moderation information submitted by the first user may be weighted more heavily when applying moderation criteria than moderation information submitted by the second user, or the moderation information submitted by the second user may not be considered at all. In addition, future annotations from the first user may be analyzed against different moderation criteria than the second user. Illustratively, future annotations from the first user may require a fewer number or percentage of positive moderation information responses than for users in general (or moderation at all) before the annotations are provided to all users, or the first user may be placed on a special permission list or "white list" in which annotations are automatically distributed to more users or all users. Future annotations from the second user may require a higher number or percentage of positive moderation information responses than for users in general before the annotations are provided to all users, or the second user may be placed on a restricted list or "black list" in which distribution of annotations is automatically suppressed.

Figure 4:
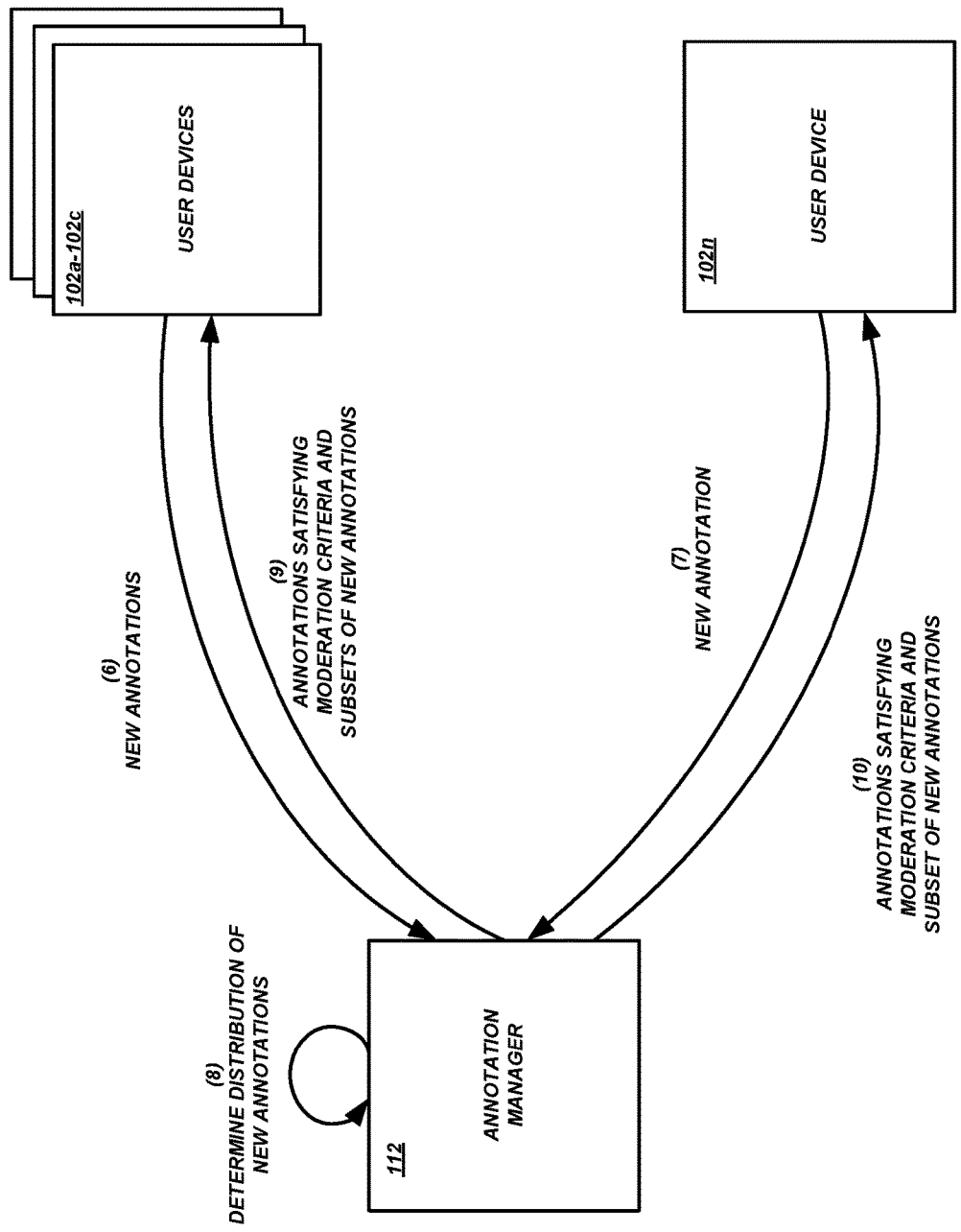

After block 216, the process 200 may return to decision block 206 and/or block 212, where future distributions of annotations are determined and initiated. As shown in FIG. 4, the annotation manager 112 may receive new annotations at (6) from user devices 102a, 102b, and/or 102c. At (7), the annotation manager 112 may receive a new annotation from user device 102d. The annotation manager 112 can determine at (8) how to group subsets of the new annotations for distribution to the user devices. Once the determination is made, the annotation manager can determine which existing annotations may now be provided to additional user devices. The annotation manager can then distribute the selected new and existing annotations to the user devices 102a, 102b, and/or 102c at (9), and to the user device 102n at (10). The operations shown in FIGS. 3 and 4, and described above with respect to the process 200, may be repeated throughout the content session as long user devices 102a-102n continue to submit new annotations and/or moderation information regarding existing annotations.

User Interfaces for Dynamic Display of Annotations

FIGS. 5, 6, 7, 8, and 9 show illustrative user interfaces for the dynamic display of annotations. The content management system 100 may generate the user interfaces and provide then to the user devices 102. For example, the content server 110 may generate Hypertext Markup Language ("HTML") code that causes browser applications 106 to display the interface. In some embodiments, the content management system 100 may provide annotations and metadata to user devices 102, and specialized applications 104 may interpret the metadata and display the annotations appropriately.

In some embodiments, as described in greater detail above, content and annotations may be provided to multiple user devices in connection with a live or substantially real-time content presentation session. In some embodiments, a user device may access content and corresponding annotations after a content presentation session has ended. In these embodiments, the annotations that satisfy moderation criteria may be presented at a relative time, during presentation of the content item, that corresponds to the time at which the annotations where originally created on a user device, transmitted to the content management system, received by the content management system, etc. Thus, the delay that may otherwise occur when an annotation goes though the moderation process may be reduced or eliminated when user devices access the content item and annotations after moderation has already completed.

Figure 5:
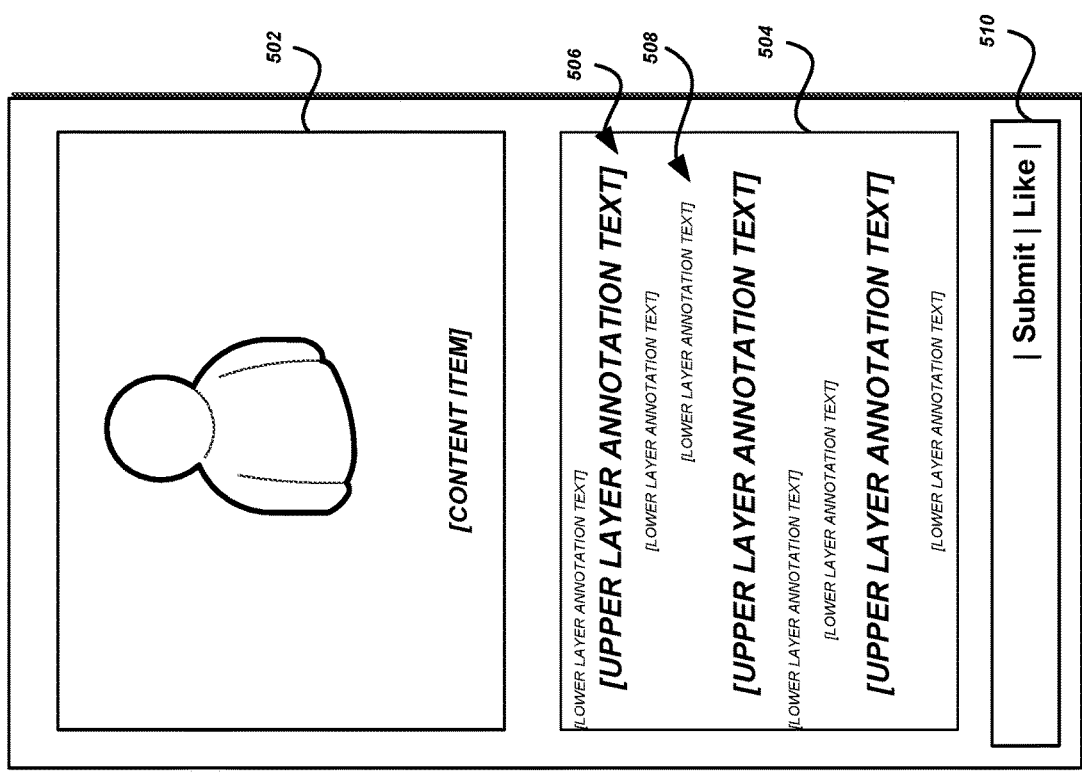
FIG. 5 is a pictorial diagram of an illustrative user interface showing the dynamic display of annotations according to some embodiments.

FIG. 5 shows a user interface 500 that displays content, and also displays annotations in a way that may draw a user's attention to some annotations (e.g., highly rated or relevant annotations) while other annotations (e.g., less highly rated or relevant annotations) appear to be de-emphasized. The user interface 500 includes a content portion 502 and an annotation portion 504. The content portion 502 may provide video playback of a video stream that is being provided to multiple user devices at the same time or substantially the same time. The annotation portion 504 can display annotations entered by users of the various user devices to which the content is currently being provided. For example, a user may enter an annotation in an annotation entry portion 510, and the user device 102 may then transmit the annotation to the content management system 100 for processing as described above.

The annotation portion 504 can display annotations differently depending upon certain characteristics of the individual annotations (e.g., whether they have satisfied moderation criteria, based on their overall rating or relevance, whether they are newer or older, etc.). In some embodiments, the annotation portion 504 may include at least two different regions: a primary region and a secondary region. The primary region may be larger and/or may be displayed at least partially on top of or otherwise more prominently that the secondary region. For example, the annotation portion 504 may display annotations in a multi-layered manner. As shown in FIG. 5, an upper display layer 506 may be used to display highly-relevant or highly-rated annotations, and/or new annotations to be moderated by the user. A lower display layer 508 may be used to display less-relevant or lower-rated annotations. The annotations in the upper display layer 506 may be presented using text that is larger, bolder, and/or higher in contrast than the annotations in the lower display layer 508. Such a display configuration can give the impression that the upper display layer 506 is on top of lower display layer 508, or closer to the surface of the user device screen or the user's eyes than the lower display layer 508.

In some embodiments, the annotations in the upper display layer 506 and/or lower display layer 508 may scroll across the annotation portion 504. For example, both the upper display layer 506 and lower display layer 508 may scroll annotations in a vertical manner, from bottom to top or from top to bottom. The layers 506 and 508 may scroll at different speeds to focus a user's attention on the slower-scrolling layer and to give the effect that the layer is physically on top of another layer with space in between them. For example, the upper layer 506 may scroll more slowly than the lower layer 508. Thus, more display time may be given to the higher-rated or more-relevant annotations in the upper layer 506 than the lower layer 508. In some embodiments, different groups of annotations may be presented adjacent to each other, rather than in overlapping layers. For example, the highly-relevant or highly rated annotations may be displayed in a first display band that is larger and/or scrolls at a slower speed than a second display band for the less-relevant or lower-rated annotations.

When a user viewing the user interface 500 wishes to provide moderation information about a particular annotation, the user may select the annotation and activate a dynamically-displayed moderation button or link (not shown). In some embodiments, a user may stop or slow the scroll of an entire layer or a single annotation in order to more closely inspect the annotation and/or provide moderation information.

Figure 6:
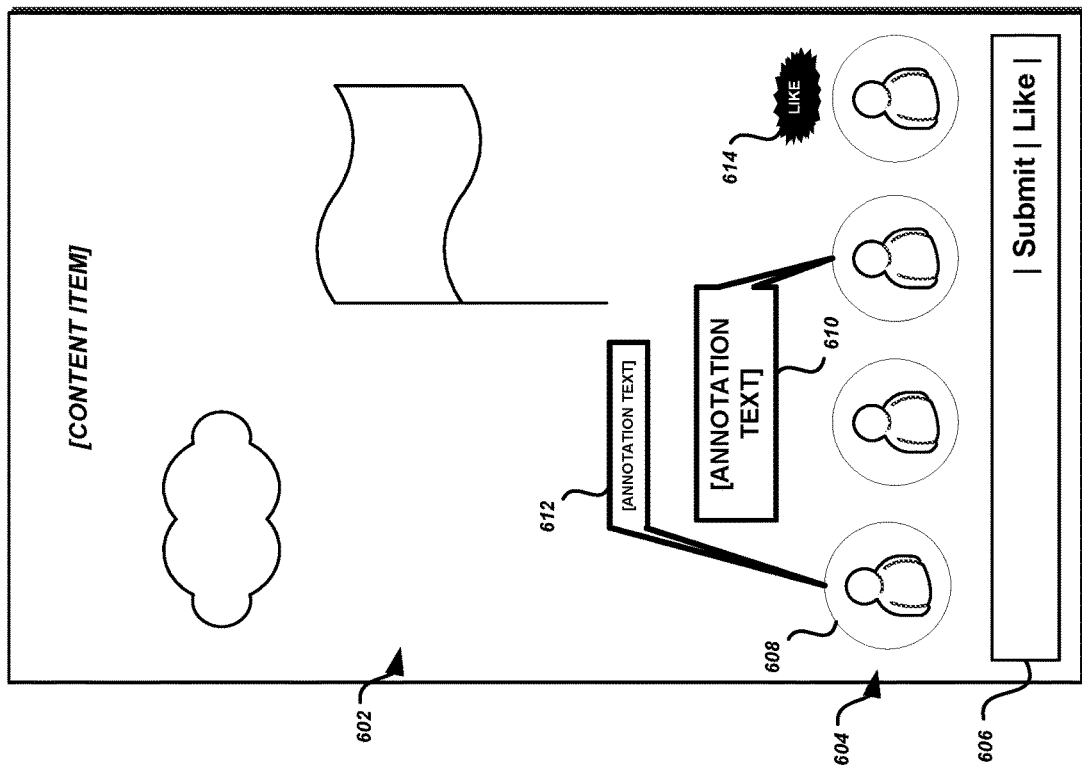
FIG. 6 is a pictorial diagram of another illustrative user interface showing the dynamic display of annotations according to some embodiments.

FIG. 6 shows another user interface that displays content and annotations. The user interface 600 in FIG. 6 is shown displaying content 602 in substantially full-screen mode. The interface 600 can include an annotation entry portion 606. The interface may also include an annotation display portion 604 that can display avatars or icons 608 for each of the users currently viewing the content. This display configuration may be used when a number of users currently viewing the content is below a threshold. Otherwise, if too many user avatars are displayed, the avatars may not all fit in the annotation display portion 604, or the annotation display portion 604 may need to expand and overlap or obstruct the content 602. When an annotation is to be displayed, the annotation may be shown in connection with the avatar 608 for the user who submitted the annotation (the author of the annotation). For example, an annotation may be displayed in a speech "balloon" or "bubble" 612 that points to the author's avatar 608. New annotations and/or more relevant annotations can be displayed in larger balloons 610 than older and/or less relevant annotations 612. In some embodiments, annotations that have been displayed for all or a threshold amount of their assigned TTL may fade away (e.g., become increasingly more transparent), shrink in size, and/or float away from the author's avatar until the annotation disappears from the annotation display portion 604. Non-text based annotations may also be displayed. For example, as shown, a "like" for a particular portion of content may be visually represented by an icon 614 that initially appears in connection with the avatar of the user submitting the "like."

Figure 7:
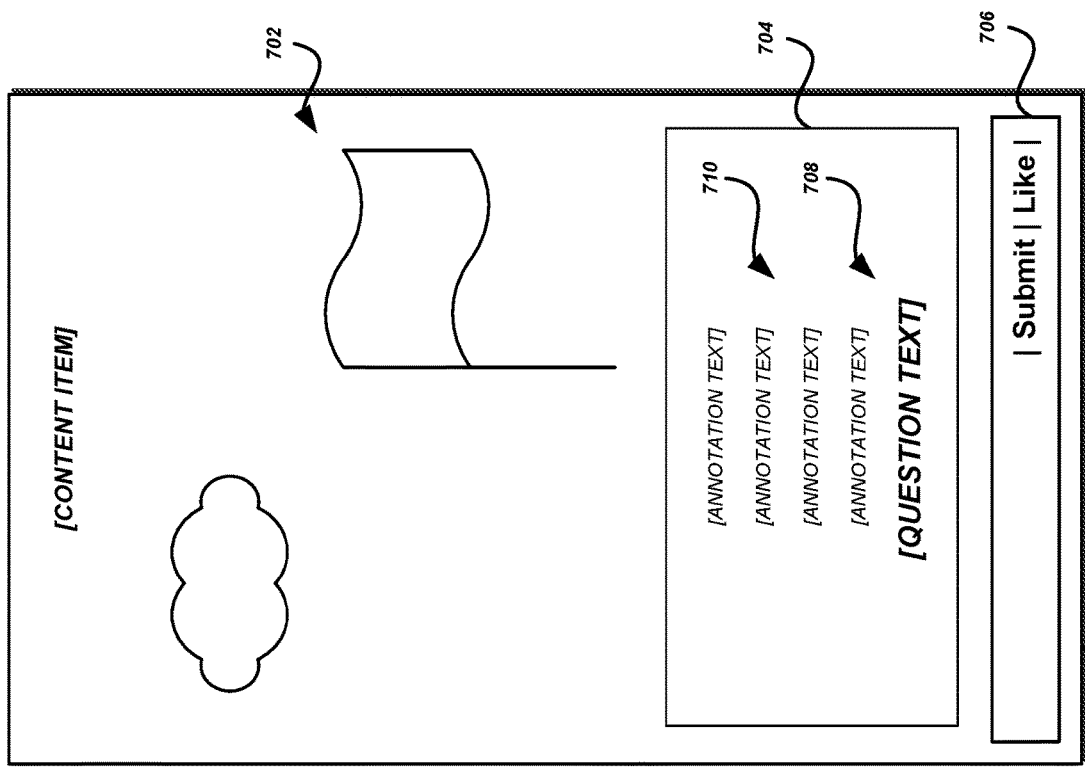
FIG. 7 is a pictorial diagram of an illustrative user interface showing the dynamic display of different types of annotations according to some embodiments.

FIG. 7 shows a user interface 700 that may be similar in some respects to the interface 600 shown in FIG. 6. The user interface 700 shown in FIG. 7 can be used to present different annotation types in different ways. For example, a particular user may submit a question as an annotation. Such an annotation may be treated differently than other annotations so that users can respond to the annotation. Illustratively, a user may enter a question into the annotation entry portion 706. In order to specify that the annotation is to be treated as a question and therefore differently than other annotations, the user may preface the annotation with a predetermined code (e.g., "QQ"), activate a link or button to mark the annotation as a question, or the like. As shown, a question 708 may be displayed in the annotation display area 704 larger than other annotations 710. The question 708 may also or alternatively be displayed with a longer TTL so that users have a chance to respond to the question. While the question 708 is displayed in a larger manner and/or for a longer period of time than other annotations, the other annotations may continue to scroll up or across the annotation display area 704.

Figure 8:
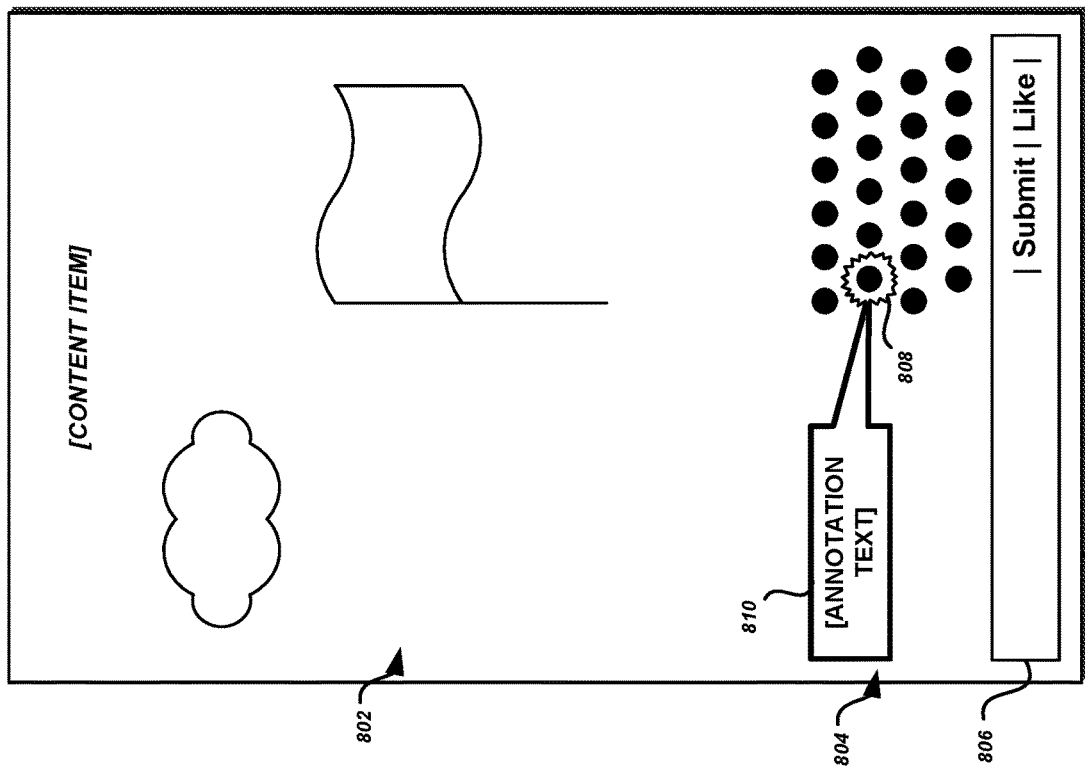
FIG. 8 pictorial diagram of an illustrative user interface showing the dynamic display of annotations from many users according to some embodiments.

FIG. 8 shows a user interface 800 that may be similar in some respects to the interface 600 shown in FIG. 6. The user interface 800 shown in FIG. 8 can be used to present annotations and visual indicators for users when there are a larger number of users than would be feasible to present using the interface 600 of FIG. 6. For example, if the number of users currently viewing or annotating a displayed content item 802 is greater than a threshold, then smaller avatars or placeholders 808 (e.g., small dots or even single pixels) may be displayed in the annotation display portion 804 to represent the various users. An annotation 810 from a particular user may be shown in a speech balloon pointing to the user's placeholder 808. Alternatively or in addition, display of the user's placeholder 808 may be altered when the user's annotation is being presented. For example, a dot representing the user may be illuminated more brightly, or may have some other visual treatment applied to it, when an annotation from the corresponding user is displayed.

Figure 9:
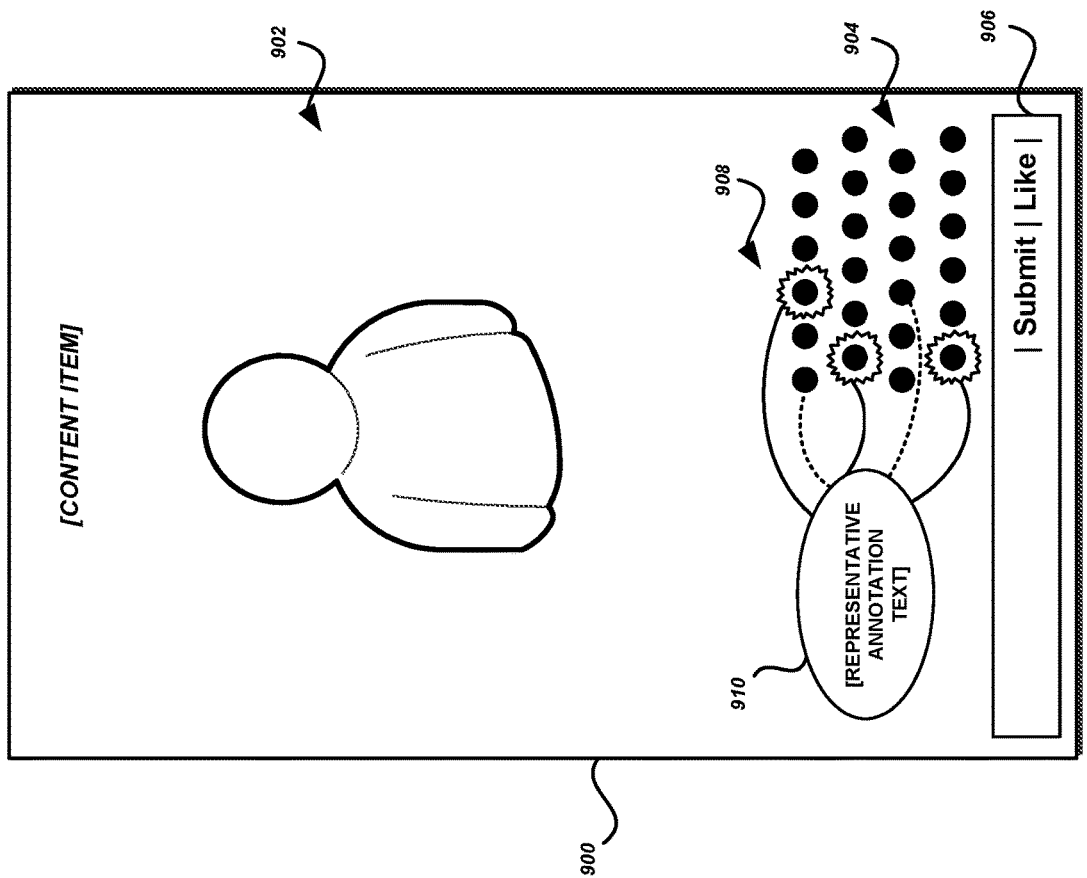
FIG. 9 is a pictorial diagram of an illustrative user interface showing the dynamic display of grouped similar annotations according to some embodiments.

FIG. 9 shows a user interface 900 that may be similar in some respects to the interface 600 shown in FIG. 6. The user interface 900 shown in FIG. 9 displays particular visual effects when the same (or substantially the same) annotation is submitted by multiple users or a threshold number of users. For example, a particular portion of a content item 902 may be humorous. Multiple users may submit annotations indicating their laughter in the annotation entry portion 906 of their respective interface displays at substantially the same time or within a predetermined window of time (e.g., "lol," "rotfl," "haha" and "that's funny!"). The user devices 102 may transmit the annotations to the content management system 100, and the annotation manager 112 may determine that the various annotations are substantially similar based on predetermined mappings of alternatives or analogous words or phrases, based on the use of natural language processing components, and the like. The first such annotation may be provided to a subset of users for moderation, as described above. Once the annotation manager 110 determines that the first such annotation has passed the moderation criteria, the annotation manager 110 can choose a representative annotation (e.g., a predetermined representative annotation, the annotation that is used the most in the group, the annotation associated with the highest score or correlation during natural language processing, the first such annotation that has satisfied the moderation criteria, etc.), and provide the representative annotation to the user devices 102. Similar annotations can be automatically determined to satisfy the moderation criteria based on their similarity to the annotation that has satisfied the moderation criteria. In some embodiments, multiple similar annotations may be distributed for moderation, and their moderation information may be aggregated to determine whether the moderation criteria is satisfied. Thus, when multiple similar annotations are received, the moderation process may proceed more quickly and a representative annotation may be sent to a larger subset or all user devices 102 more quickly to maintain a temporal nexus with the event that give rise to the multiple similar annotations.

The user devices 102 can then display the representative annotation 910 and provide a visual connection (e.g., arrow, lead line, etc.) to the avatars or placeholders 908 for the users that submitted the similar annotations. In this way, users can be presented with the common annotation in a dynamic way that mimics group interactions such as applause, laughter, and the like, without the users being subjected to multiple displays of the same or similar annotations separately.

In some embodiments, visual connections to the avatars or placeholders 908 may not be shown at the same time, but may instead be shown at different times and/or for different lengths of time in order to reflect different timing and/or wording. For example, the representative annotation may be provided with a delay, based on the moderation process as described above. As another example, the arrows or lead lines from the annotation to individual avatars (or other visual effects applied to the avatars) may be shown in substantially the same order in which the annotations are received by the content management system 100 from the corresponding user devices 102. As a further example, there may be some delay between the display of visual effects applied to the various avatars. The delay may be based on the observed timing with which the annotations were received, or it may be based on some other timing such as the delay for moderation (e.g., the delay may be equal to or calculated from the moderation delay associated with the first such similar annotation that was received, described above). Additional similar annotations submitted to the content management system 100 during the display of the representative annotation may be shown with little or no delay.

In some embodiments, the arrows or lead lines (or other visual effects) may be shown for longer periods of time when the actual annotation that is sent it longer or otherwise different (e.g., all caps, multiple punctuation marks, etc.), or the visual effect for individual avatars may be different to reflect differences in the actual annotations (e.g., a "smiley face" may be added to a representative "lol" annotation, or shown next to the avatar or placeholder of the user who submitted the smiley face). As a further example, the visual effects applied to the avatars may be shown with some element of pseudo-randomness in timing or length of display in order to mimic the submission of annotations at slightly different times or in different ways. In some embodiments, a representative avatar, icon, or placeholder may also or alternatively be displayed in connection with grouped or representative annotations. For example, rather than displaying an object for each user in the annotation display portion 904, a single representative or composite icon may be displayed in connection with the representative annotation.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more computer processors in communication with the computer-readable memory, the one or more computer processors programmed by the executable instructions to at least:
   establish a video presentation session, wherein individual portions of a video stream are provided to each of a plurality of user devices concurrently during the video presentation session;

receive first annotation data from a first user device of the plurality of user devices, wherein the first annotation data represents a first annotation to a portion of the video stream;

receive second annotation data from a second user device of the plurality of user devices, wherein the second annotation data represents a second annotation;

select one of a first graphical representation of the first annotation or a second graphical representation of the second annotation as a graphical representation of both the first annotation and the second annotation based at least partly on a greater relative usage of the first annotation with respect to the second annotation; and transmit annotation display data to at least a subset of the plurality of user devices, wherein the annotation display data causes individual user devices of the subset of user devices to display the graphical representation of both the first annotation and the second annotation in connection with display of the portion of video stream.

2. The system of claim 1, wherein the one or more processors are further programmed by the executable instructions to determine that the first annotation and the second annotation satisfy a similarity criterion based at least partly on a predetermined mapping between annotation content.

3. The system of claim 1, wherein the one or more processors are further configured by the executable instructions to generate the annotation display data to cause display of:

a first visual effect associating the graphical representation of both the first annotation and the second annotation at a first time with a first display object, wherein the first display object is associated with the first user device; and a second visual effect associating the graphical representation of both the first annotation and the second annotation at a second time with a second display object, wherein the second display object is associated with the second user device.

4. The system of claim 1, wherein the portion of the video stream comprises a time-based subset of the video stream.

5. The system of claim 1, wherein the one or more processors are further programmed by the executable instructions to at least:

receive video content from a content provider during the video presentation session; and transmit the video stream, representing the video content, to the plurality of user devices during the video presentation session.

6. The system of claim 1, wherein the annotation display data instructs user devices to display the graphical representation of both the first annotation and the second annotation in a particular display layer of a plurality of display layers.

7. The system of claim 1, wherein the one or more processors are further programmed by the executable instructions to at least:

determine that the first annotation comprises a question; and transmit, to the subset of the plurality of user devices, information indicating that the graphical representation of both the first annotation and the second annotation is to be displayed using a different display configuration than at least a portion of graphical representations of other annotations.

8. The system of claim 1, wherein the one or more processors are further programmed by the executable instructions to at least transmit, to the subset of the plurality of user devices, display metadata associating a first portion of a group of annotations with a primary display region and a second portion of the group of annotations with a secondary display region, wherein individual user devices of the subset of the plurality of user devices are configured to display the group of annotations in a multi-region view according to the display metadata.

9. The system of claim 1, wherein the one or more processors are further programmed by the executable instructions to determine the subset of the plurality of user devices based at least partly on moderation information received from individual user devices of the plurality of user devices.

10. A computer-implemented method comprising:

as performed by a computing system comprising one or more computing devices configured to execute specific instructions, receiving first annotation data from a first user device of a plurality of user devices, wherein the first annotation data represents a first annotation to a portion of a video stream;

receiving second annotation data from a second user device of the plurality of user devices, wherein the second annotation data represents a second annotation to the portion of the video stream;

selecting one of a first graphical representation of the first annotation or a second graphical representation of the second annotation as a graphical representation of both the first annotation and the second annotation based at least partly on a greater relative usage of the first annotation with respect to the second annotation; and transmitting annotation display data to at least a subset of the plurality of user devices, wherein the annotation display data causes individual user devices of the subset of user devices to display a graphical representation of both the first annotation and the second annotation in connection with display of the portion of video stream.

11. The computer-implemented method of claim 10, wherein the selecting one of the first graphical representation or the second graphical representation is performed in response to determining that the first annotation and the second annotation satisfy a similarity criterion.

12. The computer-implemented method of claim 10, further comprising generating the annotation display data to cause display of:

a first visual effect associating the graphical representation of both the first annotation and the second annotation at a first time with a first display object, wherein the first display object is associated with the first user device; and a second visual effect associating the graphical representation of both the first annotation and the second annotation at a second time with a second display object, wherein the second display object is associated with the second user device.

13. The computer-implemented method of claim 10, further comprising determining a time-based subset of the video stream with which the first annotation is associated based at least partly on the annotation data.

14. The computer-implemented method of claim 10, further comprising generating the annotation display data, wherein the annotation display data instructs user devices to display the graphical representation of both the first annotation and the second annotation in a particular display layer of a plurality of display layers.

15. The computer-implemented method of claim 10, further comprising:
   determining that the first annotation comprises a question; and
   transmitting, to the subset of the plurality of user devices, information indicating that the graphical representation of both the first annotation and the second annotation is to be displayed using a different display configuration than at least a portion of graphical representations of other annotations.

16. The computer-implemented method of claim 10, further comprising transmitting, to the subset of the plurality of user devices, display metadata associating a first portion of a group of annotations with a primary display region and a second portion of the group of annotations with a secondary display region, wherein individual user devices of the subset of the plurality of user devices are configured to display the group of annotations in a multi-region view according to the display metadata.

17. The computer-implemented method of claim 10, further comprising determining an association of content of the first annotation and the second annotation based at least partly on performing natural language processing on the first annotation and the second annotation.

* * * * *